Figure 1:
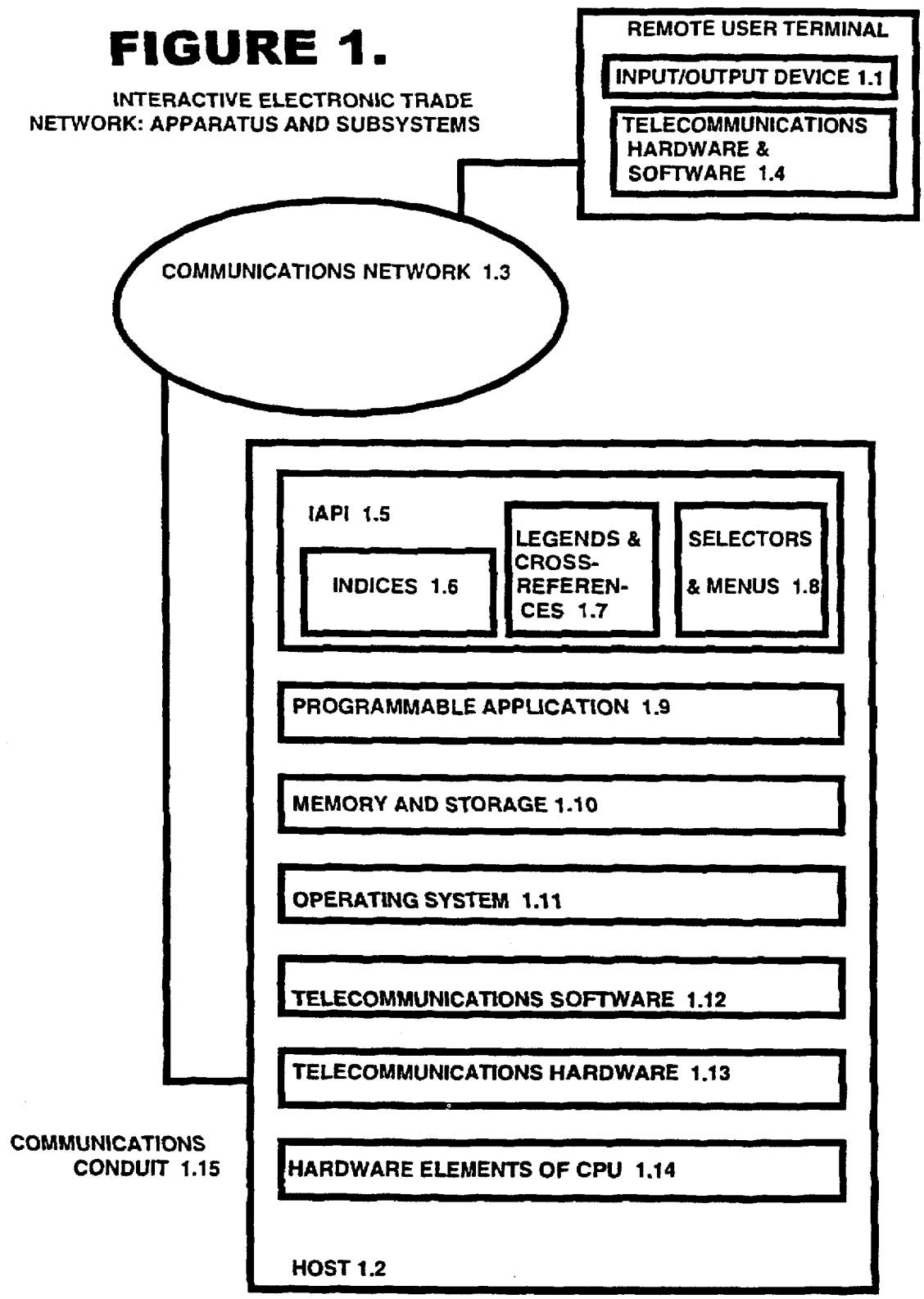

United States Patent [19]
Hoffer

[11] Patent Number: 5,799,151
[45] Date of Patent: Aug. 25, 1998

[54] INTERACTIVE ELECTRONIC TRADE NETWORK AND USER INTERFACE

[76] Inventor: Steven M. Hoffer, 5438 Bryant Ave., Oakland, Calif. 94618

[21] Appl. No.: 506,371

[22] Filed: Jul. 24, 1995

Related U.S. Application Data

[63] Continuation-in-part of Ser. No. 222,671, Apr. 4, 1994, abandoned.

[51] Int. Cl.$^6$ .................................................. H04L 12/18
[52] U.S. Cl. .................. 395/200.34; 395/968; 395/972; 395/200.49; 705/37; 345/330
[58] Field of Search .................. 395/800, 200.02, 395/200.12, 103, 968, 972, 200.34, 200.49; 705/37; 345/330

[56] References Cited

U.S. PATENT DOCUMENTS

| | | | |
|---|---|---|---|
| 4,648,037 | 3/1987 | Valentino | 364/408 |
| 4,870,571 | 9/1989 | Frink | 395/200 |
| 4,884,217 | 11/1989 | Skeirik et al. | 364/513 |
| 5,206,934 | 4/1993 | Naef, III | 395/200 |
| 5,208,912 | 5/1993 | Nakayama et al. | 395/200 |
| 5,257,185 | 10/1993 | Farley et al. | 364/419.19 |
| 5,339,392 | 8/1994 | Risberg et al. | 395/161 |
| 5,388,258 | 2/1995 | Larsson et al. | 395/600 |
| 5,590,319 | 12/1996 | Cohen et al. | 395/604 |
| 5,617,539 | 4/1997 | Ludwig et al. | 395/200.02 |

OTHER PUBLICATIONS

Markoff, "Computing in Groups," High Technology, Nov. 1986, pp. 56–57.
Black, "The Source: Dishing Up Information for Business and the Home," Link-Up, Apr. 1989, pp. 31,32,38,39.
Marc Boisseau et al., "ISDN Layer 1 to 3 Implementation," 1989, pp. 4–53 to 4–55.
"Desk Max™ : Desktop MultiMedia Conferencing", Proceedings of The Fourth International Conference on Signal Processing Applications & Technology pp. 1043–4047, Oct. 1, 1993.

*Primary Examiner*—Alyssa H. Bowler
*Assistant Examiner*—John Follansbee

[57] ABSTRACT

An interactive trade network is described that integrates distributive messaging using a host computer and telecommunication networks, real-time interactive communications, a hierarchical knowledge matrix containing two familiar and comprehensive indices of classes of goods and classes of establishments and a legend of trade-related, cross-reference terms or parameters, a multiline programmable application, an integrated application program interface, and integrated application programs. The Host System uses each Index Number of each of the indices as a topic board name. The apparatus creates a highly-selective media for either (a) messaging on mutually exclusive indexed topics of trade or (b) engaging in pubic or private real-time conferencing or electronic mail dedicated to any class of indexed economic activity. It enables progressive discussions on, and the retrieval of just the information needed under, discrete indexed topics on trade instantaneously. The interface typically facilitates access to one of thousands of topic boards upon input for, or interpreted to, three key strokes in the selector process. Users may review, broadcast, post or "chain" messages to one party or multiple parties, whether known or anonymous. Messages are cross-referenceable by geographic codes, time and other alpha-numeric descriptors.

25 Claims, 6 Drawing Sheets

FLOW CHART OF MENUS

FIGURE 3.

SELECTOR MENU DIAGRAM

3.2 PRESS SECOND DIGIT 3.1 PRESS FIRST DIGIT

[0] 0
[1] 1
[2] 2
[3] 3
[4] 4
[5] 5
[6] 6
[7] 7
[8] 8
[9] 9

3.3 PRESS LAST KEY 3.4 PRES

[0] 10
[1] 11
[2] 12
[3] 13
[4] 14
[5] 15
[6] 16
[7] 17
[8] 18
[9] 19
[N] 20 AND

[0] 00
[1] 01
[2] 02
[3] 03
[4] 04
[5] 05
[6] 06
[7] 07
[8] 08
[9] 09
[N] 10 AND ABOVE
[C] COMBINED TOPICS

SCHEMATIC DIAGRAM OF PARTS OF THE PROGAMMABLE
APPLICATION INTENDED FOR CUSTOMIZED USE
(PRIOR ART)

FLOW CHART OF SYSTEM COMMAND FLOW IN "CORRIDOR" TO JOIN HIERARCHICAL TOPIC BOARDS
(PRIOR ART)

DIAGRAM OF TEMPLATE MENU (ALTERNATIVE EMBODIMENT)

INTERACTIVE ELECTRONIC TRADE NETWORK AND USER INTERFACE

(a) CROSS-REFERENCE TO RELATED APPLICATIONS

This is a Continuation-In-Part of application Ser. No. 08/222671, filed 1994 Apr. 4, now abandoned.

(b) BACKGROUND OF THE INVENTION

1. Field of Invention

This invention relates to an integration of computer hardware, software, communication systems, hierarchical indexing and cross-referencing to convert familiar economic index codes into discrete bi-directional communication channels for messaging. In particular, the subject invention pertains to an apparatus allowing intercomputer communication for implementing collaborative messaging between two or more users concerned with messaging on any indexed topic in a data base for economic activity, or a portion of such a topic.

2. Description of the Prior Art

A. Prior Art On Conferencing

Distributed computer systems, using many decentralized personal and commercial computer systems became a pragmatic alternative to large central or main frame computers years ago. When a user performs an operation of a traditional computer application using a personal computer, he relies on an input device such as a keyboard or mouse to generate an event in the programmable application that invokes a change in the application's internal system or primes a processes that yields output. These computer systems may be connected to one another by telephone lines using modems to translate and interpret the encoded data transmitted between systems.

An example of this capability is set out in U.S. Pat. No. 5,206,934, issued to Naef, III, "Method and Apparatus For Interactive Computer Conferencing", which introduced an invention that comprises a computer and program and architecture for implementing conferencing among computers that can share information if they share a common application called "Ineract." Prior art also includes inventions, like U.S. Pat. No. 5,208,912, issued to Nakayama et. al, "Joint Information Processing System Comprising A Plurality of Terminal Apparatuses Guaranteeing Indenticalness of Data Processing Results", that provide joint data processing methods and systems, including a plurality of workstations, that are loaded in advance with common control programs and linked with each other via a circular communications path, in which input operations accomplished from respective workstations in a random manner are equally reflected onto the other terminals. One limitation of these Local Area Network approaches, however, is that they cannot support outside, non-networked end-users that would like to participate in message exchange and file transfer.

When a traditional application without complex graphics is expanded from a single user into a multiple user environment, such as simulating a conference over a network or modem, each user on the conference must be able to retrieve all the text data, or successive messages. To do this, each machine must interpret and transmit information about what the user is doing and what the user is seeing. Both point to point and point to multipoint real-time communication, for instance, have been able to transmit identical text to a plurality of addressed users, over terminals with hardware filters that are linked to a common bus, by employing techniques like those using "destination address codes" or "n-bit content tags", as described in U.S. Pat. No. 4,870,571, issued to Frink, "Intercomputer Communications Based On Message Broadcasting With Receiver Selection".

B. Prior Art on Multimode Messaging

Figure 4:
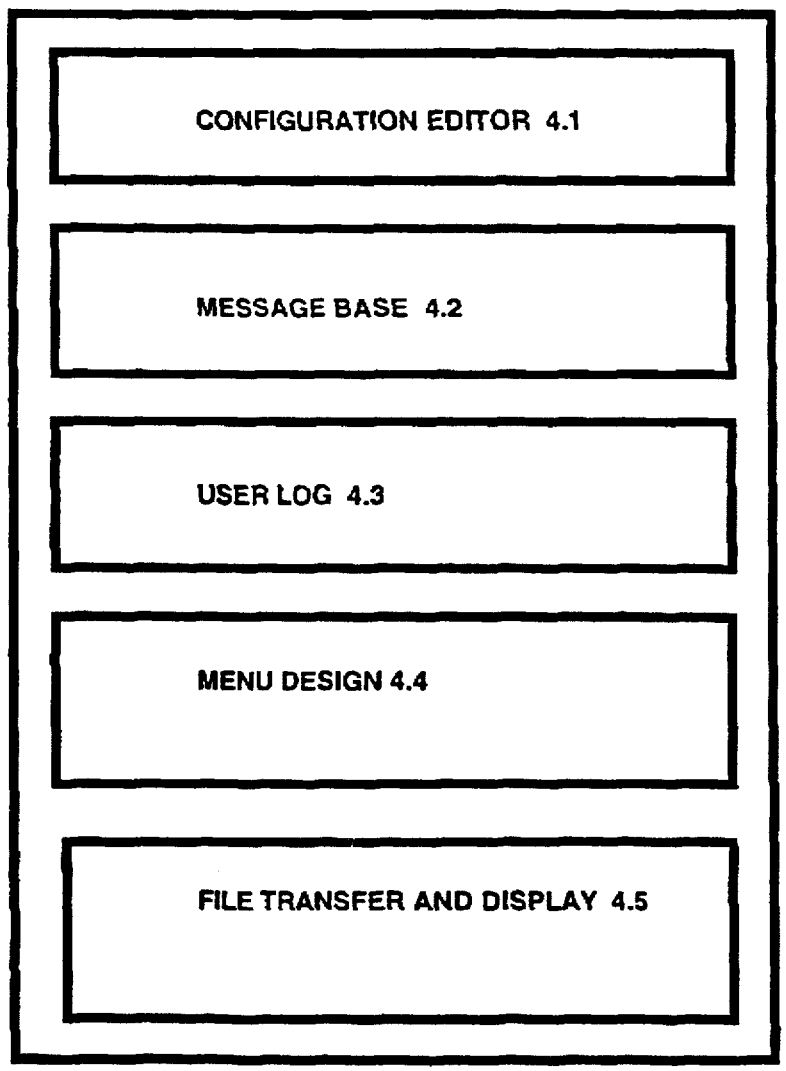

Similar point to point or multipoint computer communications have augmented the prior art by supporting electronic bulletin board software (BBS) applications that enable multiuser computer conferencing and message exchange. Over a dozen commercially available BBS platforms support multiple simultaneous users, and the ability to share messages and files across telephone lines. These applications provide networking, interface customization, security, and user accounting. One BBS application developed by eSOFT, dubbed the bread board system (or TBBS), provides host programs with subsystem that support store-and-forward topic board messaging, real-time conference boards, electronic mail, a message storage and retrieval system, and file display and transfer functions (FIG. 4). TBBS, written in Assembly, serves as a component of the alternative embodiments set out below. It allows system builders to arrange a library of menu functions, including key-word search of a designated file or index, with system files and commands and features that may be combined in an unlimited number of ways to create an unique interactive and real-time messaging media for two to sixty-four concurrently logged-on remote user terminals.

Host mode terminal programs like TBBS enables a computer comprised of a central processing unit and memory as basic as a 486 Personal Computer, with a DOS or Windows-NT operating system and a multiport hardware and software module, to serve as a remote host and multiuser information center for other computers. The host terminal and remote terminals, despite their varied hardware and lack of common software, each include a display screen, and an input/output device or keyboard, all of which are connected to an input/output interface. The remote terminals only require enough memory to hold a screen's worth of display characters and attributes, the control logic to translate the characters in the memory into video for the screen or cathode ray tube ("screen"), and an RS-232 interface to connect the data terminal to a computer or modem.

The remote terminals are capable of serial data exchange using terminal programs that enable the remote user to control his modem, send and receive data over serial links and transfer data or program files between computers directly or over a public or private communications network. The host terminal receives, interprets and processes inputs from remote terminals and produces host action outputs. It also encodes output received from remote terminals into encoded commands, and sends encoded prompts, data, menus, documents, and messages to remote terminals. More precisely, the host terminal's serial port converts internal computer data bytes into a serial data stream to send by accepting a byte from the computer and then shifting it out one bit at a time to the serial data line. The serial port also receives a serial data stream one bit at a time and combines these bits back into bytes, which are then transmitted into the computer.

TBBS, Version 2.2, provides a programmable application (PA) that supports loading and running a continuous multiline network. The PA interprets menu and system commands and other inputs that permit users to select a topic or conference board or other option as a communication path. Users at the remote user terminals may navigate through a logical series of customized menus to reach one of many options, via a selected communication path, to display messages or send messages regarding a single selected board or to complete another function.

The PA operates unattended as a host mode terminal program and comprises: (a) a configuration editor to set up system-wide options (including communication ports, multiport options, system settings, message board definitions and other options) (4.1); (b) a data base and data base maintenance utility (4.2); (c) a set of menu design capabilities such as a language editor, a menu editor, a question and answer language compiler, a system definition language ("SDL") decompiler and compiler to create a system of menus (4.3); (d) a userlog data and editor (4.4); and (e) file transfer and display system files, message and header controls, and communication protocols (4.5). The host terminal need not rely upon UNIX operating systems nor UNIX protocols, nor LINUX or other UNIX emulator, for message exchange.

TBBS software supports partitions in the host terminal's memory to concurrently process messages from multiple users over (a) hierarchical topic boards, that may be nested in four layers of 63 sub-topics in each layer, and (b) numerous real time conference boards that interleave each participant's data or remarks across distinct lines of each users' display screen automatically. The configuration editor (4.1) supports user entry of messaging modes and distinct topics through the system developer's configuration of message topic board options, real time conference board definitions. It also permits the system developer's management of authorization access features, menu format options, log-on greetings, and terminal definitions.

Inside a topic board, the user may navigate by entering single keys or system commands to read, review, add, edit, save and delete messages. These functions may be completed without additional apparatus-specific adaptation to these PA commands. Once inside a "corridor" (FIG. 5) to join the desired topic board, but before the user formally "joins" his topic, the user may be prompted to press [R] to Read messages (5.1) and then to select [Y] to pause between messages (5.2).

Once the host terminal receives the proper input (i.e. [R] or [Y]), it prompts the user to list |O| options (5.3). Then the user is prompted to begin the process to join the pre-selected topic board that matches a selection chosen. Specifically, the user is prompted to: a) select [S] for show (5.4) and then [A] for all (5.5); b) initiate the process to join a desired topic by pressing |J| (5.6); c) select the desired topic number he wants to join by typing a system-assigned topic number (generally |1| followed by the Enter key [CR])(5.7); (d) confirm his selection [Y] (5.8) and e) display messages by pressing |CR|.(5.9)

As the user presses Enter, the host terminal transmits to the user's terminal those messages stored or received by the apparatus under the selected topic board with the identical data saved on or sent to the selected topic board. In the course of the user's message retrieval attempt, the PA extends to the user an option of responding to each message displayed, as described more fully below.

Once the user has entered the message reading mode, the PA will then prompt him to "|C|ontinue" reading or to go to the "|N|ext" message. The user may also |J|ump to the next topic selected, add a message, switch to either another topic board or a different messaging mode or end his session.

When the user returns to that joined topic board he may selectively retrieve messages with an alphanumeric string in the headings of messages by pressing |S| (rather than |R| as indicated above at 5.1) and by typing the string he desires after selecting "To", "From" or "Subject" (5.10).

By pressing the "|A|dd Msg" prompt |A| (5.11), the user may post or broadcast his own messages or responses on the joined topic board displayed. The posted message may in turn spur numerous reply messages that are also stored on the same topic board nearly instantaneously after they are transmitted by responding users. Messages or responses may be prepared on-line by typing or in advance in ASCII text format by uploading. ASCII texts may be uploaded after filling out the initial "To", "From" and "Subject" lines that are displayed automatically upon selecting |A|. The PA further allows users to review chains of related messages, and also exclude unrelated ones, that reside on a joined topic board. This PA, if supported by a proper interface, also supports a combined read capability to retrieve messages across thematically grouped topic boards.

(i) New Prior Art Arising After Date Of Parent Application's Filing

As messaging systems like TBBS blended messaging modes with a range of utilities, others prepared next-generation messaging methods for application sharing, whiteboard, and realtime audio-video desktop messaging that supported either proprietary or international standards. Still others refined methods of parallel processing to search heterogeneous databases that were network accessible, and to hasten transactions using split commands. The primary standards-making body for the videoconferencing industry is a sector of the International Telecommunications Union (ITU-T). The ITU-T's 1990 approval of the H.320 standard revolutionized videoconferencing by enabling different manufacturers' systems to interoperate.

Application's Filing

As an improvement, TBBS's system prompts (5.1 through 5.9) may, however, be fully streamlined by using a macro. One way to achieve this simplification is by using a menu editor to add source code in certain menus to automatically and constructively call a set of stored commands based on a user's last physical menu command. More specifically, the added source code is introduced at the end of a menu field to "flatten" a hierarchical set of topic boards by adding a /S switch and to set a series of forced commands using an /I switch. The /I switch was introduced in TBBS Version 2.3 in 1995. TBBS may be installed on a node or workstation in most LAN environments, and its users can, through centrally processed commands, access disk media on the server the same as local media.

(ii) The Internet, WWW, Hyperlinks or Agents

After the above-captioned parent application was filed, those knowledgeable in the art have made it efficient for a developer of real applications, that focus on the untrained end-users and their requirements, to make PAs like eSofts' TBBS accessible through routers and telecommunications lines so as to allow users to interactively log-on (or "Telnet") through the Internet. The basic packet protocol used to connect machines globally on the Internet is the Internet Protocol (IP); and the IP interacts with Transmission Control Protocol (TCP) to provide an application protocol interface. Telnet access using TCP/IP is enormously efficient and economical because asynchronous serial transmission of packs of data across a shared circuit usually cost far less than those messages using a dedicated voice line. This is particularly true when users place a local call to an Internet service provider, log-on, and telnet to a distant host terminal from the Internet in lieu of a long distance call.

Internet users now telnet to real applications residing on multiline systems. Similarly, users may reach a desired application by selecting options from a network of graphical hypertext servers linked by the Internet called the World Wide Web (WWW). Thus, a real application may be reached via World Wide Web sites with URL addresses, which in turn offer hypertext links, or one-click access, to telnet virtually instantly to real applications. These advances provide an economical means for multiple internet users to concurrently access WWW sites and employ hyperlinks. Hyperlinks permit users to navigate nearly instantly into open PA-assisted data services, modes and options, including topic boards with mouse clicks or other inputs that replace more cumbersome means of option selection.

The alternative embodiments of the present invention also could be described with many available existing TBBS or third-party add-on options. Some of these options facilitate electronic mail, data exchange and Telnet access from numerous nodes on the Internet. Similarly, the information presentation and messaging capabilities described below could be complimented by using information agents together with host program technology. These systems would jointly conduct unattended computer-driven searches of adjacent open data bases and Internet-connected servers for topic-specific trade data. This data may be stored in the proper topic board to supplement the more lively user-generated messages. The system may be adapted to support these features, without host terminal reliance on UNIX or even a UNIX emulator like LINUX.

C. Prior Art On Data Retrieval and Expert Knowledge Systems

The overarching utility of such electronic conferences residing on such custom or commercial software, however, may depend upon both the enabling software that supports the communication function and the embedded knowledge system used to guide end-users to the desired data. Knowledge systems have supported users in tasks of learning, information retrieval, or problem solving. An example of this type of knowledge system is reflected by U.S. Pat. No. 4,648,037, issued to Valentino "Method and Apparatus for Benefit and Financial Communication", which discloses and claims a system and method for making available financial and employee benefit information to any one individual of a group of individuals who are members of an employer's benefits plan. This type of system, though "interactively" operated in the limited sense of evoking user commands, was used solely to retrieve data. Another commercial application called "Tenderlink" (apparently unpatented in the U.S.) resides on the Compuserve platform and concerns trade and commerce. It is a service that uses Special Industry Classification Codes but is merely another "store and forward" service that has not offered users the interactive responsive broadcast capability necessary for the effective bi-directional idea exchange.

Another example of a knowledge system with broader interactivity, is reflected by U.S. Pat. No. 5,257,185, issued to Ann W. Farley, et al., "Interactive, Cross-Referenced Knowledge System", which teaches a method of permitting end-users to access a database for interactive learning. It uses scripts that yield pre-recorded Socratic questions in a system where the knowledge is organized by a hierarchy of topic nodes. These topics are automatically extended to several cross-referenced topics, with each node having an associated plurality of cross-referenceable information units representing a variety of types, or categories of information. A knowledge system of this type may be dynamically revised to amend topic nodes based upon standards of external usage or projected demand under various topics.

D. Prior Art On Topic-Specific Store-and-Forward Messaging

The recent profusion of commercial applications that couple knowledge systems with distributive computing range from on-line brokerage services to on-line services allowing users to engage in message exchange on a wide and dynamic range of subjects. UNIX is the operating system that predominates on most computer-moderated conferencing systems in the latter context. Many of these systems (like The WELL) are not patented, but rely on Unix style software (like Picospan by Marcus Watts) to support access to public and private conference boards. The WELL's tree and branch ("T&B") architecture promotes interactive exchange on dynamic user-defined topics and conferences. The topics on these type of services, however, are not mutually exclusive and may be redundant, discontinuous or overlap. The unknown degree of redundancy creates uncertainty for user's attempting to access a single board with all messages on the subject. The same drawbacks pertain to the USENET newsgroups on the Internet which also has other user access restraints.

In summary, the prior art has failed to effectively integrate the following five building block functions ("Five Functions") : (1) interactive distributive computing based upon telecommunication software; (2) an interface designed to easily navigate to thousands of topics using menus configured in a T&B configuration; (3) familiar hierarchical product and service trade indices that minimize redundancy using mutually exclusive topics to filter data and solely draw together interested users; (4) a software application with programmable interfaces and functions that provides the user with a choice of topic boards of logically connected or grouped messages, electronic mail and real conferencing capabilities for real-time text or video message exchange; and (5) relational storage and retrieval capabilities based on selected geographical, temporal or other alphanumeric strings. Each building block adds system versatility that distinguishes the subject apparatus from the prior art. Using the numbers of the building blocks above, comparisons show that existing services relying upon prior art do not integrate each of these building blocks to create a truly interactive trade network. Upon integration, as described below, the resulting synergies culminate in a network that promotes lively discussions by a large group of people in the form of filtered message-based conferences on mutually exclusive topics of economic activity, but relieves users of the burden of all being in the same place or available at the same time.

(c) SUMMARY OF THE INVENTION

An apparatus providing intercomputer communication for implementing collaborative messaging between two or more users that desire to read or exchange messages on any indexed topic of economic activity, or a select portion of such a topic. From a remote terminal, the user would enter selected topic boards on a Host Terminal System ("Host System") to address messages to, and receive messages from, other interested users. The apparatus's integrated application programs support access to topic boards. Topic boards are identified by four-digit index numbers ("Index Numbers") that specify (a) classes of goods in the Harmonized Tariff Schedule ("HTS"), as revised, and (b) classes of establishments in the Special Industrial Classification ("SIC") Codes (or collectively "Indices"). A user interface, consisting of a hierarchy of menus, allows a user to select a topic board by Index Number and then to review and post messages that are transmitted instantly. The user interface typically prompts the user to enter input for the first digit, for the second digit and for the last two digits of the Index Number to navigate to a selected topic board. Users may select messages with headers that include either sub-topic numbers, geographic codes, time/date designations, unique legend strings or other descriptor.

The present invention combines many of the advantages of computer moderated conferencing, and hierarchical knowledge systems described immediately above with application interface software, legends and familiar indices to introduce a highly-selective method for multimode messaging and conferencing on indexed topics of trade. It is the object of the present invention to integrate these sub-systems with indices, and legends enabling cross-referencing, that will assist end-users both to use messaging to retrieve just the information they need under a full array of discrete indexed topics on trade, and to also broadcast, post, send or "chain" messages, publicly or privately, under such indexed topics to one party or multiple parties.

The new process is based upon integrating computer networking with ubiquitous trade indices to support interactive on-line communication between exporters, importers and all other users for all data, voice or video transmissions on transnational trade, and other incidental purposes. Users may electronically access discrete topic boards to address messages to, and receive messages from, users or communities of similarly interested domestic or foreign users, when the subject of common interest is selected as a communications channel from either of the following publicly available sources:

(a) that index of names or numbers (or any index calibrated to the names or numbers) of product classifications (sections, chapters, four-digit headings, subheadings, suffixes, check digits and annexes) called the Harmonized Tariff Schedule of the United States (HTS)[1], as amended from time to time; or (b) that index of names or four-digit numbers (or any index calibrated to the names or numbers) of industry codes known as "SIC Codes" for establishments, used by the federal agencies.[2]

[1] More specifically, the HTS implements the International Convention on the Harmonized Commodity Description and Coding System, and provides as internationally agreed upon system for the classification of goods. It contains a familiar international index, with mutually exclusive topics, that has been routinely used in cross-border trade to classify all goods to assess and impose import duties. See generally, 19 USC Section 1202.

[2] SIC code numbers and descriptions are set out in Executive Office of the President, *Office of Management and Budget, Standard Industrial Classification Manual* (1987). They provide a familiar index, with mutually exclusive topics, that has been routinely used in domestic commerce to classify establishments in all fields of economic activity and which thereby defines industries in accordance with the composition and structure of the economy.

The apparatus creates a centralized network for product-specific trade messaging, that is cross-referenceable by geographic codes, time and other parameters. These parameters are set out in a system-specific legend capable of display. Table 1. The host system is configured to store within partitioned areas of its memory two parallel sets of topic boards, wherein one of the sets includes a topic board for each number in the index of goods, and the other set includes a topic board for each number in the index of establishments. The Host System uses each Index Number in each index as a separate topic board name and topic board. The system logic supports selective retrieval by entering an alpha-numeric string. The apparatus's subdivision of the memory or storage media into a plurality of these logical zones, streamlines the process that end users may rely upon to filter and locate messages or post

TABLE 1

Host System Legend

Within topic boards, users may selectively retrieve messages annotated with an asterisk and lower case code letter to permit review of a cross-section of messages solely associated with the code. Users posting messages may similarly include the code in the heading of their messages to facilitate review by other users searching for the cross-reference code.

*a — answer
*b — business, marketing, advertisement
*c — competition, fair trade, anti-trust, dumping
*d — direct foreign investment
*e — Europe
*f — foreign, exchange rates, finance
*g — governmental politics or security
*i — international
*j — Japan
*k — concentrations (mergers & acquisitions, monopolies)
*l — legal or regulatory issues
*m — markets
*n — news
*p — privatization
*q — question
*r — Requests For Proposals and other tenders
*s — sale or discount
*t — transaction (offer/acceptance)
*u — United States
*v — venture capital
*w — world or worldview
*y — emerging markets
*z — patents, research and development, intellectual property, technology and innovation
*NNNN — Country Code. International calling code; where NNNN is a number, associated with a country, which is one to four digits (i.e. Hong Kong 852.
*MM/DD/YY — Date. Month, Day & Year
**/(Geographic Designation) — Name of area, region, city, river (i.e. Latin America)

messages to interested parties who enter a specified topic board.

The HTS topic boards permit a message or article to be classified under the same number regardless of the originating country (time zone or language) from which it is sent or in which it is received. The topics are mutually exclusive. Its a system of nomenclature that provides for greater specificity as one works through the schedule with continuity in its hierarchical structure.

The HTS category numbers have 10 digits. The first 6 digits are internationally agreed upon. The remaining 4 digits are US add-ons. Digits 7 and 8 indicate rate of duty, and digits 9 and 10 are statistical suffixes.

The HTS is divided into:

(1) a Section—a major grouping of goods—22 Sections;
(2) a Chapter—a grouping of a commodity—99 Chapters;
(3) a Heading—a descriptor—first four digits;
(4) a Sub-Heading—a sub-dividing of the Heading—next 2 digits.

The SIC topic boards permit a message or article to be classified under the same number regardless of the originating state or country (or language) from which it is sent or in which it is received. The topics are mutually exclusive. Its a system of nomenclature that provides for greater specificity as one works through the schedule with continuity in its hierarchical structure.

The SIC codes for establishments have 4 digits. The first two identify the Master Group and are widely recognized. The remaining digits specify sub-headings.

The SIC is divided into:
(1) a Division—a major grouping of economic activity—11 Divisions;
(2) a Master Group—a grouping of a goods and services, etc.—99 Master Groups;
(3) a Heading—a descriptor—first two digits reflecting the Master Group;
(4) a Sub-Heading—a sub-dividing of the Heading—next 2 digits.

An example may better explain the some of advantages of a method and apparatus that integrates the Five Functions. A pearl-fisher could use the apparatus to search topic board and broadcast a message. First, he prompts his computer terminal to call in or telnet (e.g. over Internet) to the Host System. Second, he would sign-up for the service, agree to the conditions of service, learn to identify Index Numbers and enter topic boards. Using a key word search, the user would identify an Index Number like the one associated with "pearls"—7101. When prompted, he would enter input for, or serially press, the numbers 7, 1, and then 1 (for 01) to access the topic board matching 7101 on pearls, as defined by the HTS index. He may also selectively retrieve messages with the subheading code for Malaysia to review other messages on Malaysian pearls. Then he might send a message to inquire on topic board "7101" as to business conditions affecting supply in his industry such as relevant labor/strike activities.

Another user, perhaps unknown to the first but with varied hardware and no common software, may call over the Host System over public switched network ("PSN"), select that topic board, and reply to the inquiry or use information provided by the first user, or others, to assist with his own study of pearl harvests across Southeast Asia. This apparatus not only "channelizes" formerly inert index topics for lively bi-directional messaging on all economic activities, but provides a multi-dimensional filter for subject matter, interested users, geography, time and other factors in a cross-reference legend discussed below.

The apparatus establishes a messaging information center between any subset of said remote user terminals for receiving and decoding prompts, commands, messages and information. It is accessible through conduits with originating and terminating ends comprised of some combination of the public switched networks, virtual private networks, private lines, Internet nodes, microwave sites, radio facilities, coaxial cables, electricity wires, telecommunication satellites, ethernet access, and wireless communication facilities.

The apparatus is presently operable over a single network, and configured to permit interconnection as a high speed data node of the Internet. Future improvements will include upgrades from text-only messaging to all bit-based transmissions including, but not limited to, video conferencing, provided that other public messaging is not thereby precluded. As technology emerges to permit electronic "information agents" to search for germane articles or messages, the apparatus may be supplemented with capabilities to permit topic boards to be seeded automatically with germane data from open data bases. An intrinsic yet surprising benefit of this apparatus is that it will become a more and more valuable media as users increasingly add trade-related content. It teaches to convert other industry-specific uniform product codes into channels also. The network provides users with a cross-reference map between goods under HTS codes and related services under SIC codes for convenience.

(d) BRIEF DESCRIPTION OF THE DRAWING

The novel features believed characteristic of the invention are set forth in the appended claims. The invention itself however, as well as the preferred mode of use, further objects and advantages thereof, will best be understood by reference to the following detailed description of alternative illustrative embodiments when read in conjunction with the accompanying drawings, wherein:

FIG. 1. is a diagram illustrating the present invention at the system and key subsystem levels connecting to a remote user terminal through a communication network.

Figure 2:
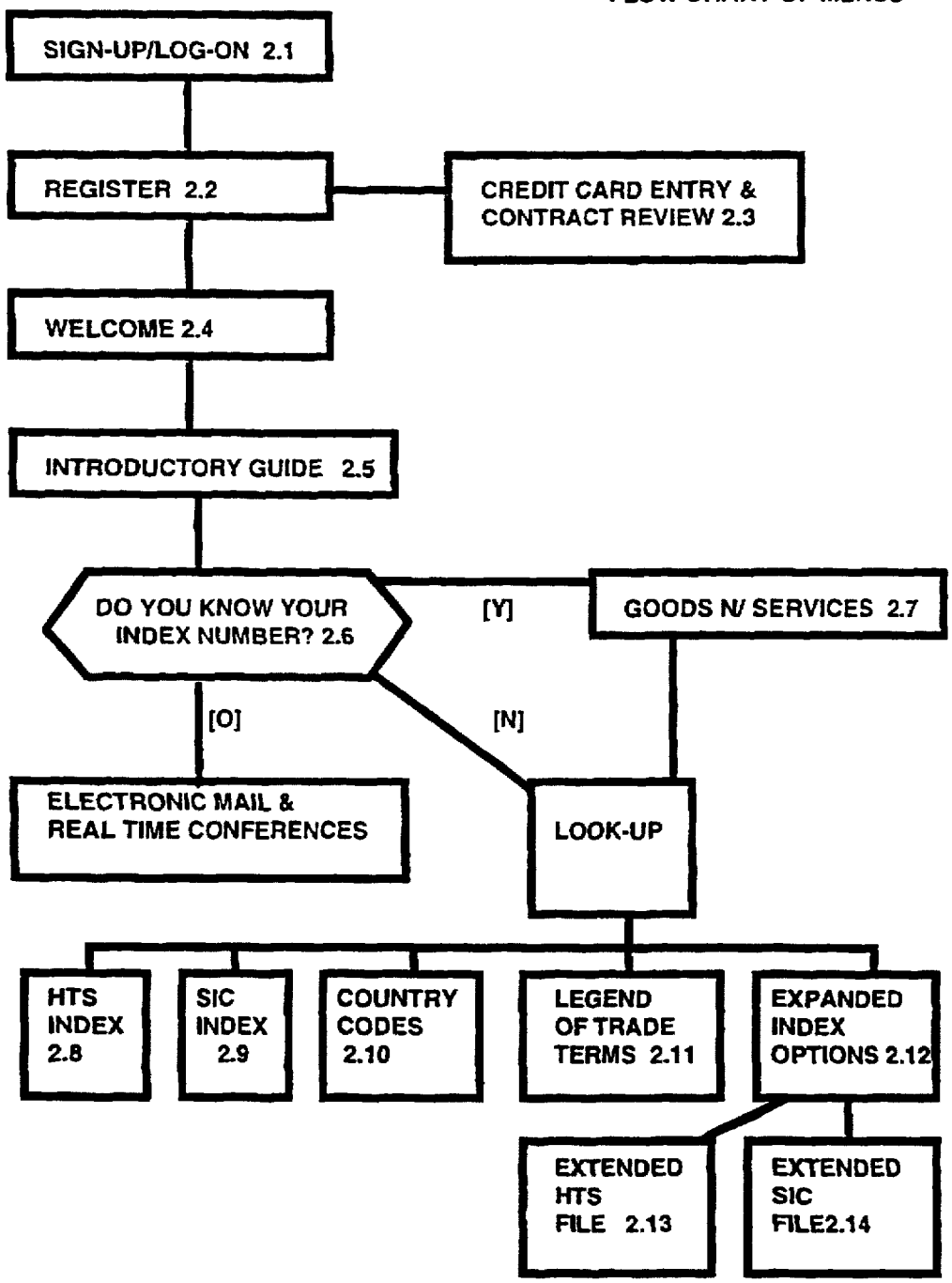

FIG. 2. is a schematic diagram showing a flow chart of menus for topic board identification in an embodiment according to the present invention.

FIG. 3. is a schematic diagram showing an example of one topic board's selector menus in an interface with hundreds of similar menus from which a user may invoke any one of thousands of discrete topic boards by typically entering three keys or unified input therefore, in an embodiment according to the present invention.

FIG. 4. is a schematic diagram showing parts of the programmable interface on the host terminal which are intended for customize use and configuration (Prior Art).

Figure 5:
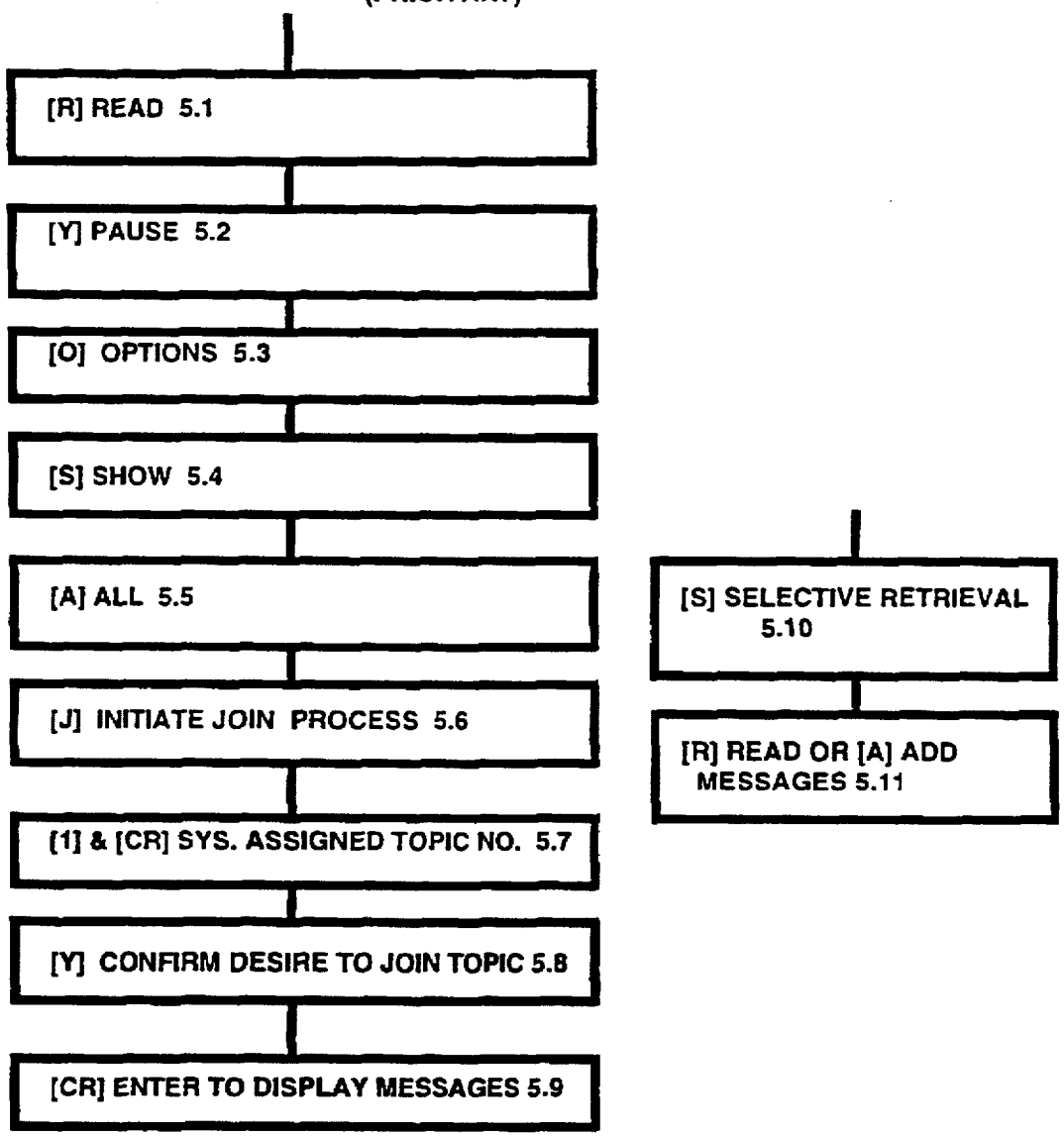

FIG. 5. is a flow chart showing how the user must navigate to hierarchical topic boards using the programmable application's system commands under an embodiment without a macro (Prior Art).

Figure 6:
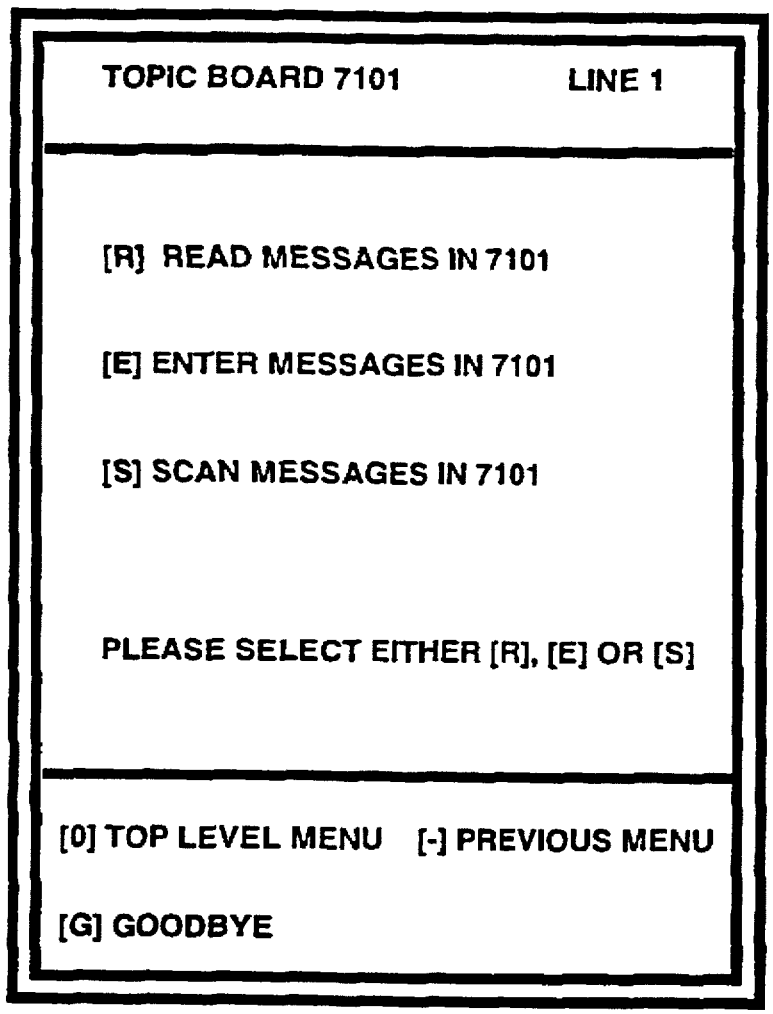

FIG. 6. is a diagram showing the menu that the user is presented under an alternative embodiment to streamline access to a topic board using a macro to force system commands upon the entry of input for a final selector menu.

(e) DESCRIPTION OF THE PREFERRED EMBODIMENT

Throughout this description, the preferred embodiment, alternative embodiments and examples shown should be considered as exemplars, rather than as limitations on the present invention.

FIG. 1 illustrates an example of an enhanced trade communication network that constitutes an embodiment of the present invention.

Each of a plurality of computer terminals (1.1) which may be similar or dissimilar, are provisioned with modems or communications modules that enable them to communicate with the Host Terminal System ("Host System") (1.2). They may retrieve or send data and messages over a communication network or system like the PSN, Internet or other conduit (1.3). Each computer, in addition to having the capability of a Central Processing Unit ("CPU") and random access memory has a communications software package that ensures that its serial data stream format is set at 8 data bits, no parity, and 1 stop bit to be compatible with the Host System's software (1.4). The Host System uses menus, embodying original source code and system files, to create an integrated application program interface ("IAPI")(1.5). The apparatus integrates the IAPI with its other sub-systems including the Indices (1.6), internal legends and cross-referencing systems (1.7), the integrated application program's selector functions and apparatus-specific menus (1.8), a programmable application ("PA") containing programs to configure apparatus-specific topic boards (i.e.

TBBS) (1.9), storage or memory (1.10), an operating system (i.e. DOS or Windows NT) (1.11), communications software (1.12), multiport modules identifying physical or logical ports(1.13), computer hardware (1.14) and communication conduit(1.15).

The PA's configuration editor (4.1) supports the system developer's manual integration of the Indices through configuration of message board options, entry of distinct topic boards and real time conference board definitions. The PA permits management of authorization access features, menu format options, log-on greetings, and terminal definitions. The PA's configuration editor supports the process of defining each Index Number in each index as a topic board name and topic board. The PA also provides electronic mail and real-time conferencing, as alternatives to topic board messaging. The real-time conference boards were configured in the PA to correspond to each HTS Section and SIC Division.

This version of the apparatus relies on a system-specific IAPI and integrated application programs that jointly guide the user to his desired destination (i.e. a topic board, electronic mail, file or form transfer or real-time conferencing) and govern the user's access; its sub-systems include:

(a) log-on (1.5);
(b) registration with credit card information (1.5);
(c) service contract display, download and approval sequence (1.5);
(d) access level designation of menu user privileges (1.8);
(e) user settings (1.8),
(f) menu content, invocation, order, hierarchy and image on the host and remote terminal monitors (1.5);
(g) message management and text file display (1.5);
(h) key word searches to yield matching Index Numbers (1.5, 1.8, 1.9);
(i) a selector apparatus that advances the user from Index Number look-up to enter topic boards (1.5, 1.8, 1.9);
(j) display relational legends and country code cross-references (1.5, 1.7);
(k) selective or relational retrieval based on geographic, temporal, or other alpha-numeric discriptors (1.5) and,
(l) downloading of relevant portions of voluminous indices (1.5, 1.8, 1.9).

The integrated application programs are those functions, or parts of those functions, identified above that are transparent to the user, including menu integration and order, system logic, selector command processing, scripts, routines, macros, forced commands, flattening switches and insertion parameters, topic board definition, conference board configurations and access parameters (i.e. repeat users automatically skip registration menu).

FIG. 2. is a flow chart that depicts how the Host System processes the users' inputs that are entered on-line. The IAPI guides the end-user toward the proper topic board ascribed with a number matching an Index Number. First, however, it records the information provided by users during the log-on (2.1) and registration processes (2.2). Thereafter, the user accepts the service agreement terms (2.3) and the IAPI displays the Welcome message (2.4), followed by the introductory user guide (2.5). After the next input, the IAPI refreshes the user's screen with another menu reflecting three options(2.6), they are: (a) to indicate that the Index Number is already known; (b) to proceed to perform a key word search to learn the Index Number needed to select the associated topic board; or (c) to switch out of the topic board mode to another application like electronic mail or real-time conferencing.

The IAPI, in tandem with the PA, processes the users' entered choice, and if the user commands, the IAPI proceeds to display a menu of look-up options. (2.7) That menu prompts the user to select and search one of the following indices stored on apparatus files: |G| goods index (HTS) (2.8), |S| services index (SIC) (2.9), |C| country code index(2.10), |L| system-specific legend(2.11), |E| expanded index search and download(2.12), or an input to proceed forward (i.e. after the Index Number has been secured) to topic boards or other options.

If a search option is selected, the next screen displayed permits the user to conduct either (a) a one-step key word search of any index by entering an alphanumeric string or (b) an extended key word search that launches the inquiry through Indices files residing on the Host System. These on-line files replicate files published by the federal government but are combined to speed up search executions. Also, there is one extended search file for each of the 22 HTS sections, which may be accessed by pressing |A| through |V|, respectfully (2.13); and one for each of the 11 SIC Divisions, which may be accessed by pressing |0|-|9|, or |Z| (2.14).

The IAPI uses a selected search input or key to access a word search prompt to accept the user's entry of an alphanumeric string. The search proceeds through the proper text file corresponding to the key pressed by the user. The text file resides in storage on the Host System. The PA sends back a display screen to the user with either a text line containing the string, along with the associated Index Number required to access the topic board, or multiple lines if the word arises in many topics, or a message stating "no match" was found with a prompt to try another search or return to other options. If the user already knew his Index Number in advance, and so indicated by entering input, the IAPI would have displayed a menu to assist the user to select either the HTS or SIC topic boards to enter either the goods or service topics, respectively ("goods 'n services menu")(2.15) This is the same menu to which users proceed following the completion of a search from the look-up menu.

As the user presses a single key option displayed on the screen by the IAPI, the inputs are translated into machine readable form. One component of the apparatus that permits this translation is the PA. The alternative embodiments of the apparatus described herein encompass an "off-the-shelf" PA known as eSoft's TBBS software, described above in the prior art. This PA contains a terminal emulation program and host programs for multiuser messaging with a range of menu building tools, scripts, templates and programmable interfaces. It serves as a shell that becomes useful to, and operable by, end-users only by adding host-specific integrated application program interfaces, menus, logic, objects, files, and hierarchical (or non-hierarchical) knowledge systems. It does provide system developers with a platform for specifying topic boards, other messaging options and file transfer and display functions that accommodate freshly added user interfaces, integrated application programs, and externally programmed menus and files. The PA's modular architecture is conducive to adding options, complementary software programs, and hardware like routers to facilitate Internet access or mail software to exchange mail with users hosted at other Internet nodes.

The PA provides an internal logic systems to translate and execute user inputs, as described above, in concert with external programming instructions. That logic system is parallel to (but interoperable with) the IAPI's logic system. The PA (a) supports the logic algorithms used to process commands (i.e. "[R]ead" or "[A]dd") once the user is inside a topic board; (b) contains stored commands, for flexible arrangement, and modular menu functions; (c) executes transport to selected topic boards and selective retrieval functions; and (d) supports electronic mail and real-time conferencing. Accordingly, the apparatus's other subsystems supplement the PA. The PA would be ineffectual as an interactive trade network without the IAPI, integrated application programs, Indices and legends.

This PA supports up to four hierarchical levels of topic boards. However, this PA exhibits two constraints: (a) each level in the T&B architecture may contain only sixty-three independently accessible topic boards; and (b) these boards may only be invoked upon the user's entry of a single key or alphanumeric character. In this context, the preferred embodiments' Indices each have over a thousand topics (divided under 99 Chapters and Master Groups). Because more than the 63 boards on PA were needed, a user-friendly IAPI "selector" method was needed to facilitate navigation within moments to any of over 1000 topic boards from the key word search mode or goods 'n services menu, without reliance upon more confusing translation tables between multiple groups of indexed topics. As a solution consistent with the hierarchy of the Indices, any topic board could be nested within a layer of subgroups of topic boards under a Chapter or Master Group, and then accessed directly from a menu configured to identify both the subgroup and the particular topic board selected.

FIG. 3. The user, after specifying whether the topic board desired is for a good or service, is prompted by the IAPI's first selector menu to enter input for the first digit of the Index Number(3.1). A second menu, prompts the user to enter input for the second digit(3.2). Thereafter, a third menu prompts the user to enter input for the third and fourth digits(3.3). For example, at the third menu, if the remaining digits are between 01 and 09, the user will press [1] to [9], respectively, to either enter the corridor to the topic board selected or a menu of topic board options for that topic. If the last two digits are higher than 09, the users will be prompted to enter [N] until a menu appears reflecting the correct two digits and the single key used to guide the system to present and display the right topic board.(3.4)

Each entered key reduces the eligible universe of topic board by an order of magnitude. It accomplishes this through an IAPI that uses numerous multi-tiered menus, constructed in an inverted T&B architecture, which interpret inputs transmitted in succession to lead to a narrower set of topic boards. One advantage of the PA adopted, is that a user may enter all the inputs to enter his topic board (e.g. select Goods, 7--1--1 for topic board 7101) prior to the display of any of the graphic selector menu. This permits a user to use or develop scripts to go through the selector menus instantly even before even appear. Most attempts will be completed after entering input for a third menu. This result occurs because the majority of HTS topics end with 01 to 09; and for SIC topics because there are rarely more than twenty-six options for which input for a single letter may be entered for the last two digits.

Inside a topic board, the user may navigate by pressing single keys to read, review, add, edit, save and delete messages. The functions may be completed, under the first of two alternative embodiments described immediately below, without additional apparatus-specific adaptation to the PA commands for the corridor to join which is described above in the prior art, and incorporated here by reference.

After the user selects a topic board using the IAPI and PA, as set out above, and presses the Enter, the Host System will transmit to the user's terminal those messages stored or received by the apparatus-specific integrated application program under the particular Index Number as they are saved on or sent to the selected topic board. In the course of the user's message retrieval attempt, the PA extends to the user an option of replying to each message displayed. The user may also send messages to the selected topic board by entering the input to add messages; either by methods that include separate line-by-line entry, full text editor mode or upload of ASCII files.

The IAPI furnishes a legend and a country code index to facilitates selective retrievals when the user's desired messages only pertain to a subset of those residing on the joined topic. This index and legend accommodate systemic cross-references to trade terms (5.10) and by geographic designation, country code, time/date, and other legend code or alphanumeric strings.

The user may post or broadcast his own messages or responses on the joined topic board that is on screen. The broadcasted message may in turn spur numerous reply messages that are also posted on the same topic board nearly instantly after they are transmitted by responding users. These messages or responses may be prepared on-line or in advance in ASCII text format. The PA further allows users to review chains of related messages, to the exclusion of unrelated messages, that reside on a joined topic board. This PA, coupled with the IAPI, also supports a combined read capability to retrieve messages across thematically grouped topic boards in accordance with the structure of said indices.

If users become sensitive to disclosing trade secrets or terms of contemplated transactions over topic boards, they may instead post point-to-point messages on the Host System by returning to the top menu and then selecting and using the electronic mail function. The users may also communicate in real time conferences supported by the PA to navigate to any group of trade topics to perform tasks like negotiation or multiparty text editing without graphics.

Under an alternative embodiment of the apparatus, however, the present invention further teaches that the PA commands to navigate to hierarchical topic boards may be simplified using a macro. A macro may be set up using insertion parameters and menu source code switches for forced commands and "flattening," namely the /I and /S switches, respectively. The macro automatically leads a user from a selector menu for selecting the last two digits of a topic board to a common template menu with a standard set of ultimate options (5.3), rather than to first confirm the topic board joined by pressing [R], [Y], [0], [S], [A], [J], [1], [CR], [Y], [CR] (5.1–5.9).

The macro consolidates a series of PA system commands into an input that is activated automatically and invisibly upon the user's entry of input for said third and forth digits of any index number. The macro is configured by "flattening" said topic board using said menu editors or compilers so that a far more limited series of PA commands is required like those PA system commands used to enter a non-hierarchical topic boards. All hierarchical menus for the third and fourth digits of said index number must be modified using the SDL decompiler and compiler to include forced commands and insertion parameter inputs, as described below. A template menu is set up using the PA configuration editor with insertion parameters, to display to user said template menu (FIG. 6) with uniform options including [R] Read, [E] Enter and [S] Scan to read messages, send messages, and scan headers, respectively, for said topic board.

With forced command capabilities in the PA, a network developer using TBBS may enter an insertion parameter to hold open a place for source code in the template menu that is automatically seeded depending upon the source code in the preceding and final topic-selector menu. Specifically, the source code set out at Table 2 shows insertion parameters %M1% and %M2% used in the template menu which are seeded, for instance, when a user selects topic board 7101, with "7101" and XIV/7101, respectively, from the referencing of terms from the legend above as they are displayed.

TABLE 2

```
Menu: KEYS
Entry 1:
{ORIG.ANS}
Priv= 0 A1=------- A2=------- A3=------- A4=------- ANS=- IBM=-
Key=? Type= 0
Entry 2:
[[1;37m [[5;21HTopic Board %M1% [[5;44HLine %LINE%
Priv= 0 A1=------- A2=------- A3=------- A4=------- ANS=- IBM=-
Key=? Type= 0
Entry 3:
[[16;21Ĥ [[1;37mPLEASE SELECT EITHER [R], [E] or [S]
Priv= 0 A1=------- A2=------- A3=------- A4=------- ANS=- IBM=-
Key=? Type= 0
Entry 4:
[[7;21Ĥ [[1;37m [[40m[R] Read Messages in %M1%
Priv= 0 A1=------- A2=------- A3=------- A4=------- ANS=- IBM=-
Key=R Type= 6 Opt Data=%M2% /S /I:"FŶ MJÍ MŶ M"
Entry 5:
[[9;21H[E] Enter Messages in %M1%
Priv= 0 A1=------- A2=------- A3=------- A4=------- ANS=- IBM=-
Key=E Type= 7 Opt Data=%M2% /S
Entry 6:
[[11;21H[S] Scan Messages in %M1%
Priv= 0 A1=------- A2=------- A3=------- A4=------- ANS=- IBM=-
Key=S Type= 8 Opt Data=%M2% /S
Entry 7:
[[19;40H<-> Previous Menu
Priv= 0 A1=------- A2=------- A3=------- A4=------- ANS=- IBM=-
Key=- Type= 12 Opt Data=1
Entry 8:
[[19;21H<0> Top Level Menu
Priv= 0 A1=------- A2=------- A3=------- A4=------- ANS=- IBM=-
Key=0 Type= 5 Opt Data=0000
Entry 9:
[[20;21H<G> Goodbye
Priv= 0 A1=------- A2=------- A3=------- A4=------- ANS=- IBM=-
Key=G Type= 10
EndMenu:
Menu: KEYS
Entry 1:
{ORIG.ANS}
Priv= 0 A1=------- A2=------- A3=------- A4=------- ANS=- IBM=-
Key=? Type= 0
Entry 2:
``` source code for the last selector menu, as set out at Table 3. Accordingly, 7101 would appear to the user as the topic board as in FIG. 6, while the computer would interpret the other inserted parameter to guided it to the subgroup of topic boards under layer XIV and to access or display topic board 7101. The individual options on that final topic-selector menu are also, thus, coded to support instant access to uniform options that reside on the template menu but are automatically dedicated solely to the selected topic board. The template menu, for instance, will then reflect individual options like [R] Read, [E] Enter and [S] Scan for topic board 7101.

From the template menu, the user may enter a single input for a topic board to either retrieve, scan headers or send messages. In other words, a topic board already uniquely identified using an interface prior to the "corridor" (5.1–5.9), is instantly equated by the interface leading to the template menu to function with the discrete data subsumed under the partitioned part of the host memory dedicated to that topic board. In lieu of selective retrieval, a user may select the scan command, review only message headers, and then mark messages for review if they contain any useful cross-

TABLE 3

```
Entry 2:
***************************
**** Goods System Menu *****
***************************
Priv= 0 A1=------- A2=------- A3=------- A4=------- ANS=. IBM=-
Key=? Type= 0
Entry 3:
[[5;5H [[1;37m [[42m[0] 00
Priv= 0 A1=------- A2=------- A3=------- A4=------- ANS=- IBM=-
Key=0 Type= 5 Opt Data=KEYS "7100" XIV/7100 /S
Entry 4:
[[6;5H[1] 01
Priv= 0 A1=------- A2=------- A3=------- A4=------- ANS=- IBM=-
Key=1 Type= 5 Opt Data=KEYS "7101" XIV/7101 /S
Entry 5:
[[7;5H[2] 02
Priv= 0 A1=------- A2=------- A3=------- A4=------- ANS=- IBM=-
Key=2 Type= 5 Opt Data=KEYS "7102" XIV/7102 /S
Entry 6:
[[8;5H[3] 03
Priv= 0 A1=------- A2=------- A3=------- A4=------- ANS=- IBM=-
Key=3 Type= 5 Opt Data=KEYS "7103" XIV/7103 /S
Entry 7:
[[9;5H[4] 04
Priv= 0 A1=------- A2=------- A3=------- A4=------- ANS=- IBM=-
Key=4 Type= 5 Opt Data=KEYS "7104" XIV/7104 /S
Entry 8:
[[10;5H[5] 05
Priv= 0 A1=------- A2=------- A3=------- A4=------- ANS=- IBM=-
Key=5 Type= 5 Opt Data=KEYS "7105" XIV/7105 /S
Entry 9:
[[11;5H[6] 06
Priv= 0 A1=------- A2=------- A3=------- A4=------- ANS=- IBM=-
Key=6 Type= 5 Opt Data=KEYS "7106" XIV/7106 /S
Entry 10:
[[12;5H[7] 07
Priv= 0 A1=------- A2=------- A3=------- A4=------- ANS=- IBM=-
Key=7 Type= 5 Opt Data=KEYS "7107" XIV/7107 /S
Entry 11:
[[13;5H[8] 08
Priv= 0 A1=------- A2=------- A3=------- A4=------- ANS=- IBM=-
Key=8 Type= 5 Opt Data=KEYS "7108" XIV/7108 /S
Entry 12:
[[14;5H[9] 09
Priv= 0 A1=------- A2=------- A3=------- A4=------- ANS=- IBM=-
Key=9 Type= 5 Opt Data=KEYS "7109" XIV/7109 /S
Entry 13:
```

Using the prior art on hyperlinks, the inputs from the selector menus, including the ones driving the macro, may ultimately be replaced by a simple click on a key word or topic board number that will bring the user the template screen to enter the selected topic board. The apparatus may also be adapted or ported to (a) other existing platforms like the WWW or newsreaders such as ones designed for USENET Newsgroups or (b) client/server applications, including but not limited to a Windows/Visual Basic system. Many options exist to serve a wider number of concurrent users or support a full set of topic-specific real-time conferences as well as topic boards. While the invention has been described in connection with specific embodiments thereof, it will be understood that it is capable of further modifications. This integrated application is intended to cover any variations (e.g. hypertext automation of selector menus, audio or video messaging), uses or adaptations of the invention following, in general, the principles of the invention, and including such departures from the present disclosure as come within known and customary practice within the art to which the invention pertains.

Having set forth the nature of the invention in the parent application and this Continuation-in-Part, I claim:

1. An apparatus for supporting multiline messaging among at least two remote user terminals ("RUTs") in addition to an unattended host terminal ("Host"), accessible from public and private communication networks supporting asynchronous transfer mode, whereby said Host integrates a programmable application ("PA") an integrated application program interface ("IAPI"), and a matrix of comprehensive indices and a cross-referencing table, to set up a public trade network with distinct modes of interactive message exchange supporting at least public topic board messaging, real-time conference boards, private electronic mail and file transfer among a plurality of RUTs, and which comprises:

means for storing in said Host's memory a matrix that includes a table of cross-references relating to trade and industry, and two internationally familiar trade indices that each have a set of mutually exclusive topics, for goods and establishments, respectively, means for electronically transmitting data to and from said RUTs of varied hardware, that may use no software used by said Host, where said Host comprises a central processing unit, operating system, a memory, a display screen, communication software, multiport module, an input control device, all of which are connected to an input/output interface, and for said Host to receive, interpret and process inputs from said RUTs and to produce host action outputs, to encode output received from said RUTs into encoded commands, and to send encoded prompts, information, menus, documents, and messages to said RUTs to permit said user at RUTs, including anonymous and returning RUTs, over said communication networks to send and receive messages and data;

means in said PA for both (i) loading and continuously running a multiline network, that uses (a) a configuration editor to set up system-wide options, (b) a data base, (c) a set of menu design capabilities, and (d) a userlog, and (ii) partitioning said Host's memory to store two parallel sets of topic boards, wherein one of said sets includes a topic board for each number in said index of goods, and said other set includes a topic board for each number in said index of establishments, and to interpret and process menu functions and system commands from said PA that permit a user at any one of said RUTs to enter commands to engage in said modes of messaging and file transfer;

means in said IAPI for said user to select one of said modes of messaging and file transfer, select between said index of goods that is dedicated to goods topics and said index of establishments that is dedicated to services topics navigate through menus and said modes using commands to find groups of logically related messages and data on any one of said topics and to send and retrieve data, means in said IAPI for said user to navigate to and within a selected mode by sending inputs that said Host interprets to display options and data, to make other communications path selections and terminate a session, and further means for said user to process an on-line key word search to identify topic boards matching each indexed alphanumeric string, to display outputs including index numbers associated with said string, to select a communications path dedicated and leading to a topic board for messaging by entering input related to said outputs, to retrieve and read messages on said topic board with content equivalent to content stored in said Host's memory for said topic board, and to send messages to be stored with equivalent content in a part of said Host's memory dedicated to said topic board which supports archiving of logically grouped messages in said data base;

means for receiving and processing encoded commands and data at said Host using all means and said modes described herein on multiple lines concurrently, for messaging and file transfer among said plurality of RUTs;

means for using topic boards as communication channels, that are each dedicated to a selected index number for store and forward messaging (a) between said user and said Host, and (b) among multiple users of said plurality of RUTs concurrently using a plurality of channels supported by said Host.

2. The apparatus defined in claim 1, which further comprises:

means for storing in said Host's memory a matrix of topics from indices and cross-references from a table comprising a familiar international index, with mutually exclusive topics, that has been used in cross-border trade to classify all goods to assess and impose import duties, a familiar index, with mutually exclusive topics, that has been routinely used in domestic commerce to classify establishments in all fields of economic activity and which thereby defines industries, and a cross-referencing legend containing a table of terms related to trade that support selective retrieval of messages;

means in said PA to store in said Host's memory, two parallel sets of topic boards, wherein one of said sets includes a topic board for each four-digit number in said index of goods, and said other set includes a topic board for each four-digit number in said index of establishments; and means for storing inside said IAPI hierarchical menus, in an inverted tree and branch architecture, to sequentially process inputs from said user to select an index and enter a topic board matching an index number by entering input identifying the first digit of said index number to pass a first selector menu, the second digit of said index number to pass a second selector menu, and data associated with the third and fourth digits of said index number to pass a final selector menu.

3. The apparatus defined in claim 2, which further comprises:

means for consolidating a series of PA system commands into a macro, that is activated automatically upon entry of input for said third and forth digits of said index number, where said macro is configured by at least (a) "flattening" said topic board using said menu design capabilities, (b) modifying said hierarchical menu for the third and fourth digits of said index number to include forced commands and set insertion parameter inputs, and (c) setting up a template menu with insertion parameters, to display to user said template menu with uniform options including |R| Read, |E| Enter and |S| Scan to read messages, send messages, and scan headers, respectively, for said topic board.

4. The apparatus defined in 1, which further comprises:

means for storing in said Host's memory a matrix of topics from indices and cross-references from a table comprising a familiar international index, with mutually exclusive topics, that has been routinely used in cross-border trade to classify all goods to assess and impose import duties, a familiar index, with mutually exclusive topics, that has been routinely used in domestic commerce to classify establishments in all fields of economic activity and which thereby defines industries, and a cross-referencing legend containing a table of trade related terms that support selective retrieval of messages; and means in said PA to store in said Host's memory, two parallel sets of topic boards, wherein one of said sets includes a topic board for each four-digit number in said index of goods, and said other set includes a topic board for each four-digit number in said index of establishments.

5. The apparatus defined in claim 4, which further comprises:

means in said PA for both (i) loading and continuously running a multiline network, that uses (a) a configuration editor to set up system-wide options, (b) a data base, (c) a set of menu design capabilities, (d) a userlog, (e) system files, and (f) system message and header controls, and (ii) operating a host mode terminal program that allows remote user terminals to access said Host's partitioned memory and functions.

6. The apparatus defined in claim 5, which further comprises:

means for storing as part of said matrix a copy of a set of Harmonized Tariff Schedule (HTS) numbers and descriptions, described at 19 USC Section 1202, as amended from time to time, and which is incorporated herein by reference;

means for storing as part of said matrix a copy of a set of Standard Industrial Classification (SIC) code numbers and descriptions set out in Executive Office of the President, *Office of Management and Budget, Standard Industrial Classification Manual* (1987), as amended from time to time, and which is incorporated herein by reference.

7. The apparatus defined in claim 4, which further comprises:

means in said PA for both (i) loading and continuously running a multiline network, that uses (a) a set of editors and utilities comprising a configuration to set up system-wide options, a language editor, a menu editor, a message base maintenance utility, a question and answer language compiler, a system definition language decompiler and compiler to create a system of menus, a userlog editor, and (b) a set of system files with source codes, system templates, communication parameters, system message and header controls, userlog data, and help texts, and (ii) operating a host mode terminal program that partitions said Host's memory to interpret and process menu and system commands that permit a user at any one of said RUTs to navigate through all menus, operate system functions, display files, and to use said data base, all modes of messaging and file transfer;

means for storing inside said IAPI hierarchical menus, in an inverted tree and branch architecture, to sequentially and instantly process inputs from said user to select an index and enter a topic board matching an index number by entering input associated with said index number for its first digit, for its second digit and data associated with its third and fourth digits to pass a first selector menu, a second selector menu, and a final selector menu;

means in the IAPI for said user to select from said RUTs a real-time communications path for a group of said index numbers from said RUTs, and means for exchanging messages virtually instantly on real-time conference boards among any subsets of said plurality of RUTs with content equivalent to content buffered and relayed by said Host;

means for using real-time conference boards as communication channels that are each dedicated to a selected group of index numbers, for virtually instantaneous messaging among any subsets of said plurality of RUTs, and means for concurrent messaging on a plurality of real-time channels supported by said Host; and means for selecting a communications path for electronic mail between said user and any subset of said plurality of RUTs, and sending electronic mail, and reading electronic mail with content equivalent to content stored in said Host's memory.

8. The apparatus defined in claim 7, which further comprises:

means for consolidating a series of PA system commands into a macro, that is activated automatically upon entry of input for said third and forth digits of said index number, where said macro is configured by at least (a) "flattening" said topic board using said menu editor, (b) modifying said hierarchical menu for the third and fourth digits of said index number to include forced commands and set insertion parameter inputs, and (c) setting up a template menu with insertion parameters, to display to user said template menu with uniform options including [R] Read, [E] Enter and [S] Scan to read messages, send messages, and scan headers, respectively, for said topic board.

9. An apparatus supporting multiline messaging among at least two remote user terminals ("RUTs") in addition to a host terminal ("Host"), whereby said Host integrates a programmable application ("PA"), an integrated application program interface ("IAPI"), and a matrix of comprehensive indices and a cross-referencing table, to set up a trade network with distinct modes of interactive message exchange supporting at least electronic mail, real-time conference boards, topic board messaging and file transfer among a plurality of RUTs, accessible from public and private communication networks supporting Asynchronous Transfer Mode, and which comprises:

means at said Host that include a central processing unit, operating system, a memory, a display screen, communication software, multiport module, an input control device, all of which are connected to an input/output interface, and means for said Host to electronically transmit and process data to and receive data from said RUTs, including RUTs operating without any software in common with said Host, with further means for said Host to receive, interpret and process inputs from said RUTs and to produce host action outputs, to encode output received from said RUTs into encoded commands, and to send encoded prompts, information, menus, documents, and messages to said RUTs to enable said RUTs to send and receive messages;

means for storing in said Host's memory a matrix of topics from indices and cross-references from a table comprising a familiar international index, with mutually exclusive topics, that has been routinely used in cross-border trade to classify all goods to assess and impose import duties, a familiar index, with mutually exclusive topics, that has been routinely used in domestic commerce to classify establishments in all fields of economic activity and which thereby defines industries, and a cross-referencing legend containing a table of terms related to trade that support selective retrieval of messages;

means in said PA for (i) loading and continuously running a multiline network, that uses (a) a configuration editor to set up system-wide options, (b) a data base, (c) a set of menu design capabilities, and (d) a userlog, (ii) executing transport to selected topic boards and selective retrieval functions, and (iii) partitioning said Host's memory to store two parallel sets of topic boards, wherein one of said sets includes a topic board for each four-digit number in said index of goods, and said other set includes a topic board for each four-digit number in said index of establishments, to interpret and process menu and system commands that permit a user at any one of said RUTs to navigate through all menus, operate system functions, display files, and to use said data base, all said modes of messaging and file transfer;

means in said IAPI for said user to commence a session, select among said modes of messaging and file transfer options, select between said goods and establishment indices that are dedicated to goods and services, respectively, navigate to and within a selected mode by entering commands that are processed by said Host to find messages and data on any one of said topics, make other selections and terminate a session; and further means for said user to process an on-line key word search in either of said full indices, to identify topic boards matching each indexed alphanumeric string, to display outputs including index numbers associated with said string, to select a communications path dedicated and leading to a topic board for messaging by entering input related to said outputs, to retrieve and read messages on said topic board with content equivalent to content stored in said Host's memory for said topic board, and to send messages to be stored with equivalent content in a part of said Host's memory dedicated to said topic board which supports archiving of logically grouped messages into said data base;

means for using each of said topic boards as a separate bi-directional communication channel, that is each continuously dedicated to a selected index number for store and forward messaging (a) between said user and said Host, and (b) among any subset of said plurality of RUTs, where concurrent use of a plurality of bi-directional channels by multiple non-overlapping subsets of said plurality of RUTs is supported by said Host;

means for selecting from said RUTs a real-time communications path for a related group of said index numbers from said RUTs, and means for exchanging messages virtually instantly on real-time conference boards among any subsets of said plurality of RUTs with content equivalent to content buffered and relayed by said Host for text and other, non-graphical, data presentation;

means for supporting real-time conference boards as bi-directional communication channels that are each dedicated to a selected group of index numbers, for virtually instantaneous messaging among any subsets of said plurality of RUTs, and means for concurrent messaging on a plurality of said channels supported by said Host;

means for selecting a communications path for electronic mail between said user and any subset of said plurality of RUTs and sending electronic mail, and reading electronic mail with content equivalent to content stored in said Host's memory;

means for receiving, sending and processing encoded commands and data using all means and said modes described herein concurrently, for messaging and file transfer, in multiple sessions among said plurality of RUTs through said Host.

10. The apparatus defined in claim 9, which further comprises:

means for storing in said matrix, as said two indices, separate sets of four digit index numbers, and associated descriptions, reproducible from full sets of Harmonized Tariff Schedule (HTS) codes and Special Industry Classification (SIC) codes; and means for storing parallel sets of topic boards that match separate sets of four digit index numbers reproducible from, a full numerical set of Harmonized Tariff Schedule (HTS) codes and Special Industry Classification (SIC) codes;

means for displaying to said user a screen from which said user may conduct an on-line key word search by entering an alphanumeric string to obtain a display of all of said HTS codes within all Sections;

means for displaying to said user a screen from which said user may conduct an on-line key word search by entering an alphanumeric string to obtain a display of all of said SIC codes within all Divisions;

means for modifying said sets of four-digit index numbers and said sets of topic boards as stored, from time to time;

means to operate a host mode terminal program in said PA for both (i) loading and continuously running a multiline network, that uses (a) a configuration editor to set up system-wide options, (b) a data base and data base maintenance utility, (c) menu design capabilities including a language editor, a menu editor, a question and answer language compiler, a system definition language decompiler and compiler to create a system of menus, (d) a userlog data and editor, (e) system files, (f) system message and header controls, and (g) communication protocols, (ii) interpreting and processing RUTs' commands received as inputs to navigate system and display menus, and exchange messages and data and (iii) partitioning said Host's memory to store two parallel sets of topic boards, wherein one of said sets includes a topic board for each four-digit number in said index of goods, and said other set includes a topic board for each four-digit number in said index of establishments; and to interpret and process menu and system commands that permit a user at any one of said RUTs to navigate through all menus, operate system functions, display files, to use said data base, and to allow users to switch during a session between all modes of messaging and file transfer.

11. The apparatus defined in claim 10, which further comprises:

means in said IAPI for said user to select a communication path dedicated and leading to a topic by invoking said PA to execute transport to a topic board associated with said communication path and to enter said topic board matching an index number by entering input in any manner that said Host may interpret for the first digit of said index number for a first selector menu, the second digit of said index number for a second selector menu, and data for the third and fourth digits of said index number;

means for consolidating a series of PA system commands into a macro, that is activated automatically upon entry of input for said third and forth digits of said index number, where said macro is configured by at least (a) "flattening" said topic board using said menu design capabilities, (b) modifying said hierarchical menu for the third and fourth digits of said index number to include forced commands and set insertion parameter inputs, and (c) setting up a template menu with insertion parameters, to display to user said template menu with uniform options including [R] Read, [E] Enter and [S] Scan to read messages, send messages, and scan headers, respectively, for said topic board.

12. The apparatus defined in claim 9, which further comprises:

means in said IAPI for processing inputs from said user to select a topic and enter a topic board matching an index number by entering input for the first digit of said index number at a first selector menu, the second digit of said index number at a second selector menu, and data for the third and fourth digits of said index number;

storing in said IAPI a number of menus to sequentially process inputs from said user specifying input for said third selector menu of said IAPI an input required to enter said index number by pressing a single key [1] through [9], if the third and fourth digits of said index number are between 01 and 09, respectively;

storing in said IAPI a number of menus to sequentially process inputs from said user specifying input at said third selector menu of said IAPI to enter said selected topic board if the third and fourth digits of said index number associated with said selected topic board are higher than 09, by entering [N] until a subsequent selector menu appears reflecting said higher third and fourth digits of said index number and then entering input that is associated with said third and fourth digits of said index number.

13. A method of messaging among at least two remote terminals in addition to a host computer that uses communications software and hardware to connect to a communication network for serial data transmission, and whereby said host computer serves as a central messaging information center that provides a plurality of remote user terminals with data in an integrated application program interface ("IAPI") that guides users at any remote user terminals through menus with menu functions to (a) select topic boards, (b) switch during any session between using store-and-forward data messaging over topic boards, public and private real-time conference board text messaging, and electronic mail, and (c) engage in file transfer and file display; whereby said host computer's other sub-systems comprise a programmable application ("PA") supporting said IAPI menu modification capabilities, system commands, menu functions, and messaging, a memory partitioned using an operating system, said PA's configuration editor for storage, and PA files, one index of classes of goods and one index of classes of industrial establishments (collectively "indices"), internal legends with terms that provide a cross-referencing systems, said method comprises the steps of:

storing in said host computer's memory, files calibrated to two complete indices that are routinely used in commerce to pervasively categorize, into mutually exclusive topics, (a) goods to assess and impose duties on imports internationally, and (b) industrial classes of establishments;

modifying said host computer's memory, using said PA to store two parallel sets of topic boards identified by four-digit numbers that match all four-digit numbers in each of said indices, and further storing a menu and said option from said PA that permits said user to conduct an on-line key word search in either of said indices to display index numbers matching an entered alphanumeric string;

receiving, interpreting and processing inputs at said host computer from said remote user terminals and for producing host action outputs;

encoding output received at said host computer from said remote user terminals into encoded commands;

storing inside said IAPI logical progressions of menus, in an inverted tree and branch architecture, means for a user at any of said plurality of remote user terminals to select an indexed set of topic boards and enter a topic board matching an index number therein by entering input associated with said index number for its first digit, for its second digit, and data identifying its third and fourth digits;

sending encoded prompts, data, information, documents, and messages from said host computer to said remote user terminals to permit said user to send and receive electronic messages to said topic board;

prompting said users to select a communications path under said index number from said remote user terminals, interpreting said user commands to retrieve and read messages, and displaying messages with content equivalent to content stored by said host computer within its memory for said topic board;

identifying commands from said remote user terminals to be processed by said host computer, and enabling users to send messages, texts in ASCII format and other data to be stored with equivalent content by said host computer in a part of its memory dedicated to said topic board;

sending for display to said remote user terminals data that has been transmitted to said host computer;

receiving, sending and processing encoded commands and data using all steps, described herein, for concurrent messaging in a plurality of topic boards by and among said plurality of remote user terminals through said host computer; and modifying all topic boards into continuously accessible communication channels for messaging (a) between said user and said host computer, and (b) between any non-overlapping subsets of said plurality of remote user terminals, concurrently, via said host computer.

14. The method defined in claim 13, wherein said host computer, in tandem with said communication network, is used as a messaging information center between any subset of said remote user terminals for receiving and decoding prompts, commands, messages and information, and whereby said information center is accessible through conduits with originating and terminating ends comprised of some combination of public switched networks, virtual private networks, private lines, Internet nodes, microwave sites, radio facilities, coaxial cables, electricity wires, telecommunication satellites, ethernet access, and wireless communication facilities.

15. The method defined in claim 14, wherein said method also comprises the steps of:

identifying for each index number in each of said indices a dedicated communications channel for continuously accessible messaging among said plurality of remote user terminals with said host computer, storing in said host computer's memory as said two complete indices sets of four digit index numbers, and associated descriptions, calibrated to full sets of Harmonized Tariff Schedule (HTS) codes and Special Industry Classification (SIC) codes;

storing parallel sets of topic boards using said configuration editor in said PA so that one of said sets of topic boards match the set of four digit index numbers reproducible from, a full set of Harmonized Tariff Schedule (HTS) codes, and so that one of said sets of topic boards match the sets of four digit index numbers reproducible from, a full set of Special Industry Classification (SIC) codes;

displaying to said user a screen from which said user may conduct an on-line key word search of said HTS codes with all Sections on one file;

displaying to said user a screen from which said user may conduct an on-line key word search of said SIC codes with all Divisions on another file; and displaying to said user, upon further input, a menu from which said user may conduct an on-line key word search of a Section-specific file containing HTS Sections I through XXII by pressing [A] through [V], respectively, and a search of a SIC Division-specific file containing Divisions A through K by pressing [1] through [9], [0] and [Z], respectively.

16. The method defined in claim 15, wherein said method also comprises the steps of:

interpreting menu commands using said IAPI to sequentially process inputs from said user specifying input for the combined third and fourth digits of said index number associated with said topic board, so that said users are prompted to press a single key [1] through [9], if the third and fourth digits of said index number are between 01 and 09, respectively;

interpreting menu commands using said IAPI to sequentially process inputs from said user that specifies input for the combined third and fourth digits of said index number associated with said topic board, so that if the third and fourth digits of said index number associated with said topic board are higher than 09, said user is prompted as many times as necessary to enter [N] until the IAPI displays a subsequent selector menu reflecting the higher third and fourth digits of said index number and then to enter input that is associated with the third and fourth digits of said index number;

storing a set of menus at said IAPI and communication paths to enter real-time conference boards, where said option in said PA at said host computer permits said remote user terminals to enter one of two sets of real-time conference boards, where each conference board on one set is dedicated to a different group of related index numbers in single HTS Sections and each conference board on another set is dedicated to a different group of related index numbers in single SIC Divisions for conducting real-time message exchange; and where said conference boards are configured in said PA and stored on said host computer's memory, and further where such conferencing is publicly open to said plurality of remote user terminals;

retrieving data at, and sending prompts, commands, data and associated messages within a real-time conference board from said host computer;

concurrent processing of inputs from said plurality of remote user terminals that may be buffered at said host computer and relayed over said communication network in real-time to an engaged plurality of remote users that separately entered a single real-time conference board, in a manner that ensures that said engaged plurality of remote user terminals display common data on each respective display screen;

receiving and decoding prompts, commands, messages and information sent over a said communication network to said remote user terminals from said host computer that in real-time are to be relayed to and displayed by remote users terminals engaged on said conference board;

receiving said encoded commands and data from a plurality of subsets of said plurality of remote user terminals on multiple real-time conference boards and processing said data for multiple sessions on said real-time conference boards simultaneously at said host computer and processing and relaying encoded commands, and text messages and inputs to said multiples sessions.

17. The method defined in claim 15, wherein said method also comprises the steps of:

means for consolidating a series of PA system commands into a macro, that is activated automatically upon entry of input for said third and forth digits of said index number, where said macro is configured by at least (a) "flattening" said topic board using said menu modification capabilities, (b) modifying said hierarchical menu for the third and fourth digits of said index number to include forced commands and set insertion parameter inputs, and (c) setting up a template menu with insertion parameters, to display to user said template menu with uniform options including [R] Read, [E] Enter and [S] Scan to read messages, send messages, and scan headers, respectively, for said topic board.

18. The method defined in claim 13, wherein said method also comprises the steps of:

real-time conferencing through said PA among said plurality of remote terminal users, to facilitate nearly instantaneous conferencing on parallel sets of real-time conference boards, supporting continuously accessible channels dedicated to index-defined groups of related topics, which conference boards are entered using a set of IAPI menus, configured in said PA and stored on said host computer's memory, where such conferencing is publicly open to said plurality of remote user terminals;

retrieving real-time messages and inputs at, and sending text messages and inputs originating from, said plurality of remote user terminals within a real-time conference board; and providing means to display said text messages originating from different remote user terminals by host computer processing that interleaves lines of text from different sources for display on screens at remote user terminals that enter said real-time conference board;

concurrent processing of text messages and inputs from said plurality of remote user terminals that may be buffered at said host computer and relayed over said communication network in real-time to an engaged plurality of remote users that separately entered a single real-time conference board, in a manner that ensures that said engaged plurality of remote user terminals display common text data on each respective display screen;

receiving and decoding commands, text messages and input sent over said communication network to said remote user terminals from said host computer that in real-time are to be relayed to and displayed at remote users terminals engaged on said conference board; and receiving said encoded commands, text messages and input from a plurality of subsets of said plurality of remote user terminals on multiple real-time conference boards and processing said data for multiple sessions on said real-time conference boards simultaneously at said host computer and processing and relaying encoded commands, text messages and input to display said multiple separate sessions separately.

19. A method of messaging among at least two remote user terminals ("RUTs") in addition to a host computer ("Host") that is a trade messaging center, that uses software and hardware to connect to a communication network that supports asynchronous transfer mode for concurrent multi-line serial data transmission, said method comprises the steps of:

configuring a programmable application ("PA") to support menu functions, system commands, and message conferencing over a single logical network;

partitioning said Host's memory using an operating system, a PA's configuration editor for storage, and PA files;

storing in said Host's memory, conferences matching a series of subdivisions from at least one published index that divides broad economic activity into mutually exclusive numbered topics that routinely are used in public and private sectors;

coordinating said Host and said PA using an integrated application program interface ("IAPI") to allow said RUTs to display menus for conference selection and to process commands to exchange messages; and establishing communications over said network between said Host and said plurality of RUTs to enable said PA to control both said Host's processing of said RUTs's commands, and said Host's transmission of data for message exchange.

20. A method of messaging among at least two remote user terminals ("RUTs") in addition to a host computer ("Host") that uses communications software and hardware to connect to a communication network for serial data transmission, said Host serving as a central messaging information center that provides a plurality of RUTs with data in an integrated application program interface ("IAPI") that integrates said Host's other sub-systems that comprise a programmable application ("PA") supporting said IAPI menu modification capabilities, system commands, menu functions, and multiline real-time text messaging.

a memory partitioned using an operating system, said PA's configuration editor for storage, and PA files, an index system reflecting at least one published index that comprehensively subdivides general economic activity into distinctly numbered topics that routinely are used in public and private sectors, and said method comprises the steps of:

modifying said Host's memory, using said PA to store in series those public and private real-time text messaging conference boards identified by numbers that match corresponding numbers in said index system, and further storing a menu and command from said PA that permits said user to conduct an on-line key word search in said index system to display index numbers matching an entered alpha-numeric string;

receiving, interpreting and processing inputs at said Host from said RUTs and for producing host action outputs;

encoding output received at said Host from said RUTs into encoded commands;

storing inside said IAPI logical progressions of menus, means for a user at any of said plurality of RUTs to select from said conference boards and enter a conference board matching an index number therein by entering input associated with said index number;

sending encoded prompts, data, and messages from said Host to said RUTs to permit said user to send and receive electronic messages to said conference board;

prompting said users to select a communications path under said index number from said RUTs, interpreting said user commands to retrieve and read messages, and displaying text messages with content equivalent to content transmitted through said Host for said conference board in real-time;

identifying commands from said RUTs to be processed by said Host, and enabling users to send messages and other data to be transmitted with equivalent content through said Host in a part of its memory dedicated to said conference board;

receiving, sending and processing encoded commands and data, as described herein, for concurrent real-time messaging in a plurality of conference boards by and among said plurality of RUTs through said Host.

21. A method of messaging among at least two remote user terminals ("RUTs") in addition to a host computer ("Host") that uses communications software and hardware to connect to a communication network that supports asynchronous transport mode and serial data transmission, said Host serving as a central messaging information center that provides a plurality of RUTs with data in an integrated application program interface ("IAPI") that coordinates the operation of said Host's other sub-systems that comprise a programmable application ("PA") supporting said IAPI menu functions, system commands, and store-and-forward messaging, an index system reflecting at least one published index that divides broad economic activity into mutually exclusive numbered topics that are used routinely in public and private sectors, a memory configured to correspond to said index system using an operating system, said PA's configuration editor for storage, and PA files, and said method comprises the steps of:

storing in said Host's memory, file capacity calibrated to each subdivision of said index system;

modifying said Host's memory, using said PA to store in a complete series those topic boards identified by multiple-digit numbers that match all multiple-digit numbers in said index system;

storing inside said IAPI sufficient logical progressions of menus with commands for a user at any of said plurality of RUTs to select from said topic boards and enter a topic board matching an index number therein by entering input associated with said index number; and establishing communications over said network between said Host and said plurality of RUTs to enable said PA to control said Host's processing of said RUTs's commands, and transmit over multiple lines messages and data on a selected topic board;

whereby a trade network supports users at said plurality of RUTs, who are each guided by said IAPI to select an economic activity, to identify that index topic that corresponds to said activity, to enter that topic board dedicated to said topic, and who are collectively able to concurrently engage in interactive data messaging on said topic boards.

22. A method in accordance with claim 38, wherein said index system is at least:

one indexed of classes of goods and one index of classes of industrial establishments (collectively "indices"), and said method comprises the steps of:

storing in said host computer's memory, a table of topic boards matching subdivisions of said indices that are used routinely in commerce to pervasively categorize into mutually exclusive topics (a) traded goods, and (b) industrial classes of establishments;

modifying said Host's memory, using said PA to store two parallel sets of topic boards, wherein each separate set's topic boards correspond to one of said indices, and are identified by multi-digit numbers that match all of its multi-digit numbers;

receiving, interpreting and processing inputs at said Host from said RUTs and for producing host action outputs;

encoding output received at said Host from said RUTs into encoded commands;

transmitting data to and from said RUTs, including anonymous and returning RUTs, over said communication network to said Host;

storing a menu and said option from said PA that permits said user to conduct an on-line key word search in either of said indices to display index numbers matching an entered alphanumeric string;

sending encoded prompts, data, documents, and messages from said Host to said RUTs to permit said user to send and receive electronic messages to and from said topic board;

prompting said users to select a communications path under said index number from said RUTs, interpreting commands from said users to retrieve and read messages, and displaying messages with content equivalent to content stored by said Host within its memory for said topic board;

identifying and decoding commands from said RUTs to be processed unsplit by said Host, and enabling users to send messages and other data to be stored with equivalent content by said Host in a part of its memory dedicated to said topic board;

receiving, sending and processing encoded commands and data using all steps, described herein, for concurrent messaging in a multitude of topic boards by and among said plurality of RUTs through said Host; and modifying all topic boards into continuously accessible communication channels for messaging (a) between said user and said Host, and (b) between any non-overlapping subsets of said plurality of RUTs, concurrently, via said Host.

23. An apparatus supporting messaging among at least two remote user terminals ("RUTs") in addition to a host terminal ("Host"), wherein said Host, comprising at least one central processing unit that supports a host mode terminal program, a memory, an operating system, a multi-port module, a display screen, communication software, and an input control device connected to an input/output interface, and integrates:

(a) a multiline programmable application ("PA");

(b) an integrated application program interface ("IAPI"); and (c) a matrix of (i) two familiar, comprehensive, and keyword-searchable trade and industry indices, each with mutually exclusive topics substantially covering all goods and all establishments, respectively, and (ii) a cross-referencing table; such apparatus comprises storing means in said Host's memory said matrix to support a multitude of conferences matching subdivisions from each published index;

messaging mean to support a trade network with distinct modes of interactive message exchange, which facilitates any combination of electronic mail, real-time conference boards, topic board messaging on mutually exclusive topic boards, and file transfer capabilities among a plurality of RUTs without common software; and processing means to centrally process all data over channels within a unified communication network supporting asynchronous transfer mode;

whereby message exchange on an economic topic is attained when a sending user at an RUT sends data to a selected board, that board is dedicated to a mutually exclusive indexed topic, that board is accessible to any users at other said RUTs including users unknown to that sending user, and at least one other RUT displays said data from that board.

24. A method of making a trade message database for users at a plurality of remote user terminals ("RUTs") to populate with data sent to and stored by a host computer ("Host"), wherein said Host's operating system loads a programmable application ("PA") to provide database capabilities, files, menu functions, system commands, configuration editor facilities, and interactive message conferencing programs via a single logical network that supports multiline serial data communications; said method comprises the steps of:

setting PA files to identify each subdivision from at least one published index that logically divides broad economic relations into mutually exclusive numbered topics, and that commonly is used in public and private sectors;

storing in said database, using said Host's systems, partitions separating each of said subdivisions to allow users at said RUTs to send data to each specific group of messages that corresponds to a narrow subdivision, and to selectively receive data solely from any of said subdivisions; and providing over said Host and said PA an integrated application program interface ("IAPI") to allow said users at said RUTs to display menus to select a subdivision, to query said Host that processes unsplit commands, and to continually exchange messages on any subdivision using said database;

whereby said Host sends and receives data to and from said RUTs, including both anonymous and predetermined RUTs, over said network for concurrent messaging across topic boards.

25. A method in accordance with claim 24, wherein said database centrally processes commands and includes a cross-referencing table of properties, and said subdivisions of said index and of said database correspond to at least one of the following:

(a) a copy of a set of Harmonized Tariff Schedule (HTS) numbers and descriptions, described at 19 USC Section 1202, as amended from time to time, and which is incorporated herein by reference.

(b) a copy of a set of Standard Industrial Classification (SIC) code numbers and descriptions set out in Executive Office of the President, *Office of Management and Budget, Standard Industrial Classification Manual* (1987), as amended from time to time, and which is incorporated herein by reference.

* * * * *

UNITED STATES PATENT AND TRADEMARK OFFICE
CERTIFICATE OF CORRECTION

PATENT NO.    : 5,799,151
DATED         : August 25, 1998
INVENTOR(S)   : Steven M. Hoffer It is certified that error appears in the above-identified patent and that said Letters Patent is hereby corrected as shown below:

Column 29,
Line 21, the claim reference numeral "38" should read -- 21 --.

Signed and Sealed this

Second Day of September, 2003

JAMES E. ROGAN
*Director of the United States Patent and Trademark Office*